United States Patent Office 3,372,619
Patented Mar. 12, 1968

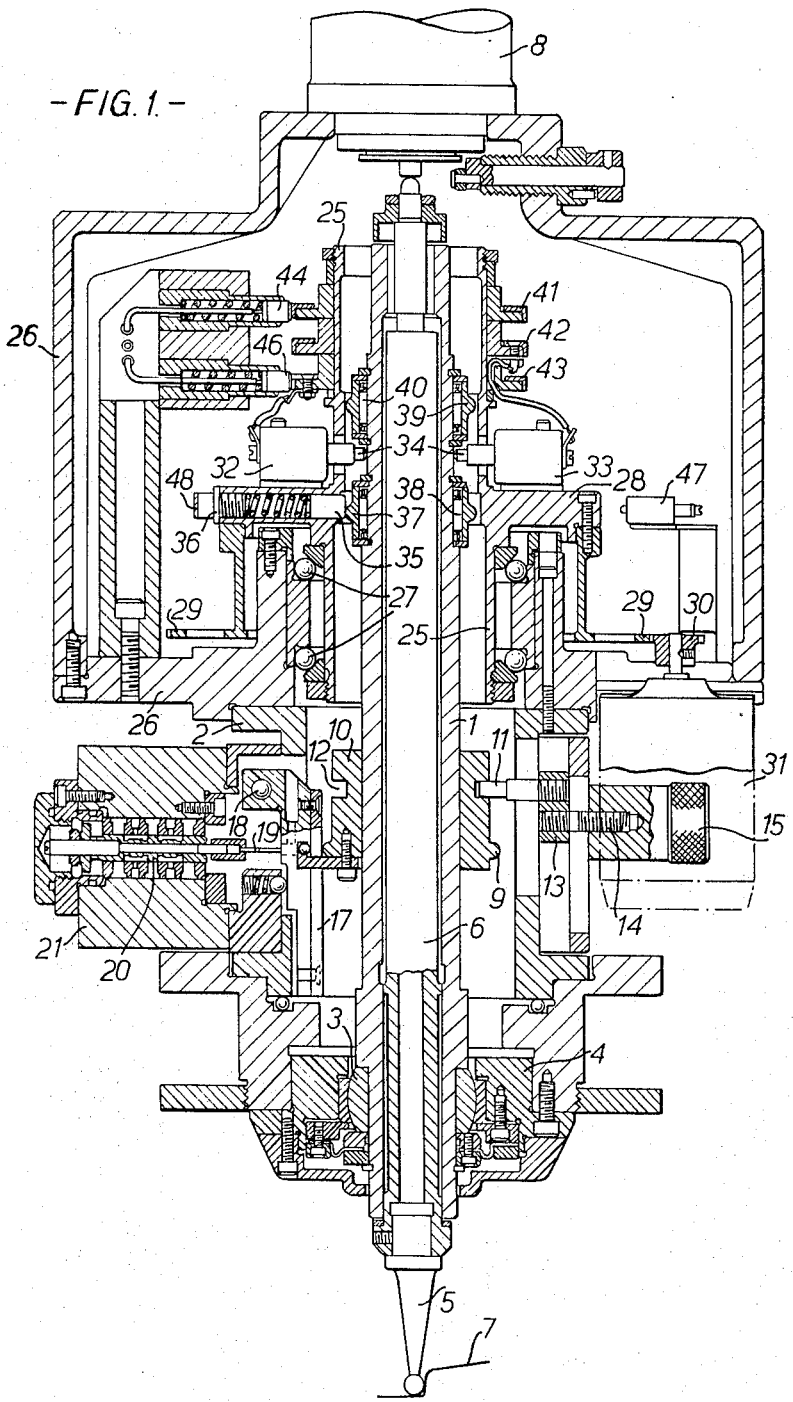

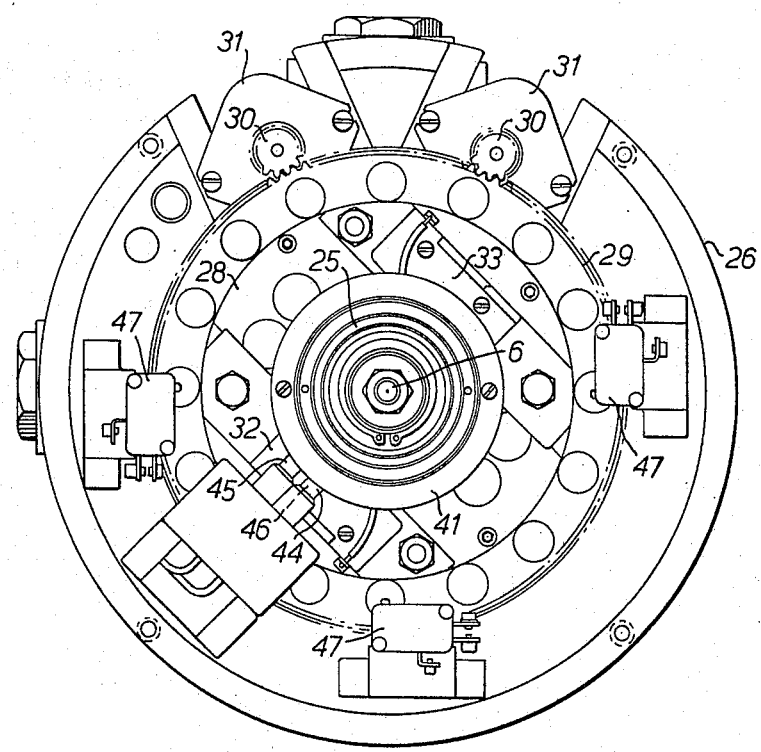

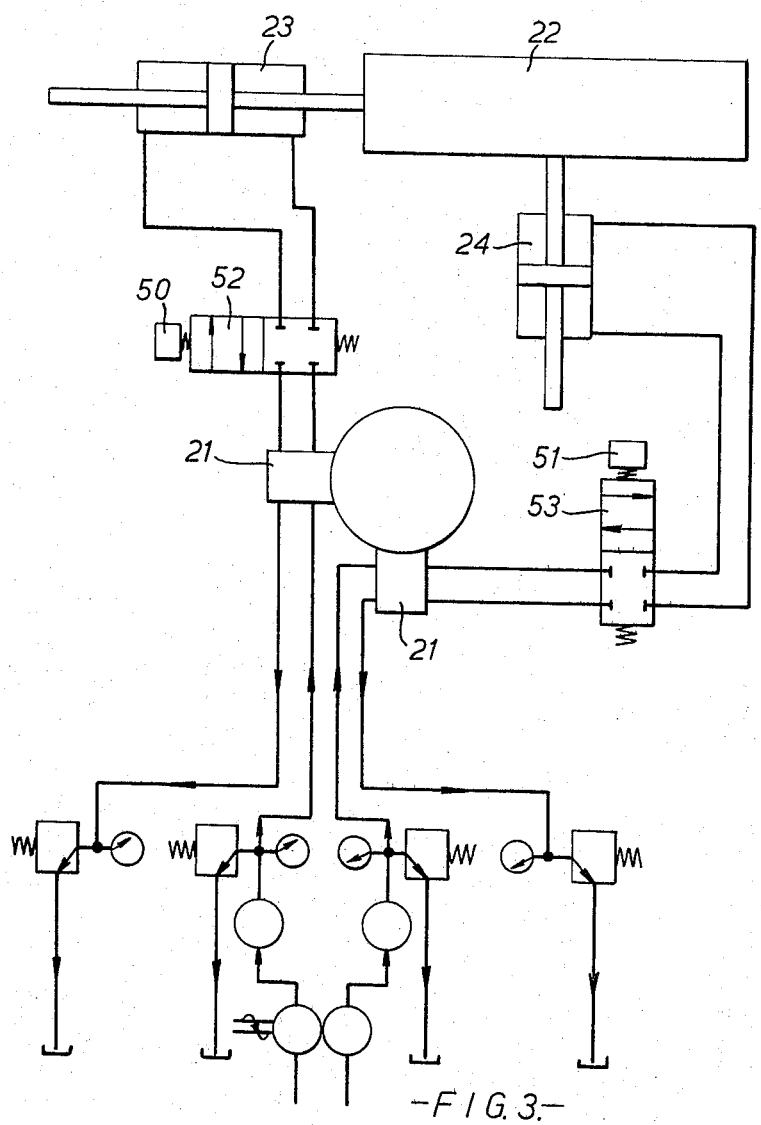
-FIG.3.-

3,372,619
TRACER VALVE CONTROL UNITS
Brian M. Clegg, Leeds, England, assignor to Hayes Engineers (Leeds) Limited, Leeds, England, a British company
Filed Apr. 29, 1966, Ser. No. 546,390
Claims priority, application Great Britain, May 11, 1965, 19,794/65
10 Claims. (Cl. 90—62)

This invention relates to tracer valve control units having a stylus to follow the profile of a master pattern and adapted to cause operation of hydraulic valve means.

Various types of tracer valve units are used in hydraulic systems on machine tools for controlling the movement of some part or parts such as a work table, a tool, a workpiece or the like. Such units often have a stylus carrying element capable of axial and/or lateral movements according to the stylus movement in relation to the master profile. Movement of the carrier element causes operation of one or more hydraulic valves in a hydraulic system or systems.

The main object of this invention is to provide an improved form of tracer valve control unit embodying means for ensuring its stylus will be held automatically in contact with the profile of a master pattern and capable of control through 360° about the axis of the tracer stylus.

Accordingly there is provided a tracer valve control unit, including a valve operating element mounted in a housing to have lateral movement to operate fluid flow control valve units, said element being operable by a stylus mounted at one end to be engaged with a master profile, a hollow carrier member disposed about said element and rotatable about a constant axis, at least one electric motor for driving said member, at least two electrical switches radially disposed on the member and operable by the said element to control the motor, bias applying means also on said carrier member for constantly urging said element towards at least one of said switches, electrical supply means for said switches in an electrical control circuit including the driving motor, said electrical switches being adapted to co-act controlling the supply of electrical power to the driving motor and thus the operation of their carrier member and the position of its bias applying means which controls the valve operating element in conjunction with the master profile.

The valve operating element may be mounted to be capable of rocking movements or of free bodily movement in one plane at right angles to its own axis which is also that of the switches. The valve operating element may be hollow and have a stylus carrying member mounted therein to be capable of axial movement for operating a further valve unit for, say, depth control purposes.

The invention will now be more particularly described with reference to the accompanying drawings, in which:

FIG. 1 is a sectional elevation of a preferred form of the improved tracer valve control device;

FIG. 2 is a plan view of the device with the top housing removed; and

FIG. 3 is a diagrammatic lay-out of the hydraulic system.

In one particular arrangement a valve operating element 1, it is hollow, is mounted in a housing 2 by means of an annular semi-sperical (in section) part 3 located in a bearing 4 to be capable of rocking movements. A removable stylus 5 is provided at the bottom of the element 1 and conveniently is carried by an axially movable member 6 mounted concentrically in the element 1 to be operated according to contact with a master pattern face 7.

Thus the stylus following the pattern will give rocking movements to both the element 1 and member 6 and can give linear movement to the member 6 to control a further hydraulic system through top valve means 8 when depth control is required for a cutter or tool. If the latter is not required the piston of the valve 8 can be moved clear of the member 6 in known manner. Alternatively, the member 6 and valve 8 are dispensed with and the stylus 5 is then mounted in the end of the element. The operating element 1 is also provided with a concentric rib 9 (or other part) on a bush 10 movable axially on said element 1. The bush is adjusted by a finger 11 entering an annular groove 12 in the bush and being carried by a sliding block 13 which is operated by a spindle 14 adjusted by a knob 15. The rib 9 engages two pivoted levers 17, each mounted on a fixed fulcrum 18, with which the connections 19 of the pistons 20 of hydraulic valve units 21 are engaged. By moving the rib 9 along the levers 17 in relation to the lever fulcrums 18 the amplitude of movement of the valve pistons 20 can be adjusted and thus the maximum permitted opening of the ports. This thus controls the maximum oil flows permitted and so sets the speed of the associated piston-cylinder operating units. Conveniently, two such valve units 21 are provided at a right angle to one another, to be connected into the hydraulic system of a machine tool, say, to control the movement of the machine tool table 22 in its linear and cross traverse movements through the operating piston-cylinder units 23, 24.

A sleeve-like carrier member 25 is mounted in the upper housing 26 to surround and be concentric with the axis of the valve operating element 1 in its upper region. This member 25 is mounted in bearings to be rotatable and such bearings may comprise ball (and/or needle roller) thrust bearing 27. The carrier member is provided with an intermediate radially disposed flange 28 furnished with a gear ring 29 with which one or more driving pinions 30 are engaged and each pinion is driven by an electric motor 31 which motors are carried by the base of the housing 26. A pair of electric micro switches 32, 33 are mounted on the flange 28 of the carrier member 25 and disposed diametrically opposite one another.

The plungers 34 of these switches are set so that they are clear of the operating element 1 when a bias force is pushing the operating element at an angle of 45° to the tangent of the master profile 7. This carrier member 25 is furnished with the bias applying means which is disposed immediately below one of said switches so as to be diametrically opposite the other electric switch but in a different, e.g., lower, horizontal plane. Conveniently, such means comprise a radially disposed spring loaded plunger 35 with screw threaded means 36 for adjusting the spring loading. This plunger engages a ring 37 mounted concentrically on the valve operating element through the medium of a needle roller (or other) bearing 38. The valve operating element 1 will thus be constantly urged by the said plunger 35 towards the switch 33 and the rocking movements of the element 1 are limited by a further concentric ring 39 also mounted thereon by means of a needle roller (or other) bearing 40 and having, when central, slight clearance from the internal diameter of the carrier member 25. Electrical supply conduction means are mounted on the carrier member for the micro switches and conveniently comprise electrically conductive supply rings 41, 42, 43 insulated from the member 25. One ring 41 forms a common supply for both switches and each of the other two rings provide a connection to one of the switches. Spring loaded brush elements 44, 45, 46 engage the supply rings and are connected into an electrical control circuit into which the driving motor or motors 31 are also connected.

Further control means are provided in the form of electric micro switches 47 disposed radially at predetermined static positions about the axis of the rotatable carrier member 25. Conveniently, there are four switches with their operating plungers equi-distant apart and adapted to be engaged by operating means 48 mounted in a predetermined position on the carrier member 25 in relation to the bias applying plunger 35, say in axial alignment therewith. The arrangement is such that as the carrier member rotates these switches are operated, one at a time, and as they are connected into an electrical control circuit to operate solenoids 50, 51 the latter will operate valves 52, 53 to control the hydraulic flow of liquid to the piston-cylinder operating units 23, 24 of a machine tool table 22, or other part or parts. Thus these switches 47 can control the lengthwise and cross transverse movements of a machine tool table or other part.

With the above arrangement, when the control circuit is switched on the carrier member 25 will be rotated by the motor 31 due to the bias applying plunger 35 urging the valve operating element 1 towards the micro switch 33. The plunger then works in conjunction with the stylus 5 which will be engaged with the master profile 7 and thus, when there is relative movement between the stylus 5 and profile 7, the plunger 35 and profile will co-act to incline the valve operating element 1 to operate the electrical switches 32, 33 which will control the motor or motors 31 to turn the carrier member in a clockwise or anticlockwise direction. The electrical circuits of the two sets of electrical switches 32, 33 and 47 are so arranged that they each control the electric motors in collaboration. They can be started by one set of switches and stopped by the other, driven forwardly or in reverse in a manner that will ensure the stylus 5 will remain always in positive contact with the master profile 7. The control is such that there can be controlled movement about 360° so that the stylus can follow a master profile in any given direction.

The driving motor or motors may be of a variable speed type to allow setting adjustment for the speed of rotation of the bias applying carrier member according to requirements, e.g., to give a required speed of response to be suitable for any cutting speeds to suit particular types of material or machining operations. More than two micro-switches 32, 33 may co-act with the bias applying plunger.

One electric motor having the desired characteristics can replace the two motors 31 which are used to provide a compact construction.

What we claim is:

1. Tracer valve control unit including a housing, a valve operating element mounted in bearing means in the housing, fluid flow control valve units operable by lateral deflections of said element, a stylus associated with one end of the element to be engaged with a master profile and deflect the element, a hollow carrier member disposed about said element and rotatable about a constant axis, at least one electric motor for driving said member, electrical switches radially disposed about said carrier member and connected into a control circuit for said motor, bias applying means on said carrier member for constantly urging said valve operating element towards at least one of said switches, electrical supply means in said motor control circuit for said switches, said switches being adapted to co-act in controlling the supply of electrical power to the driving motor and thus rotation of the carrier member which varies the radial position of said bias applying means to control the lateral movements of the valve operating element in conjunction with the master profile.

2. Tracer valve unit according to claim 1, including two sets of electric switches, the switches in each set being equi-distant apart and from the axis of the said carrier member, one said set being mounted on said carrier member and the second set in static positions outside the carrier member, means on said member for operating said second set of switches one at a time as the member rotates, both sets of switches being connected into the driving motor control circuit, and said second set being adapted to control electrical operating means for valves in a fluid operating system.

3. Tracer valve unit according to claim 1, wherein the valve operating element has a semi-spherical part, and a complementary bearing in said housing to receive said part for the element to be rockable laterally.

4. Tracer valve unit according to claim 1, wherein said bias applying means on the rotary carrier member comprises a radially disposed spring loaded plunger, a ring mounted concentrically on the valve operating element engaged by said plunger and a further ring similarly mounted on said element to limit its lateral movements within said carrier member.

5. Tracer valve unit according to claim 4, wherein said concentric rings have free running bearings between themselves and the element.

6. Tracer valve unit according to claim 1, wherein the fluid flow control valve units are disposed radially to their operating element, axially adjustable means on said element for operating said valve units, and interposed means for allowing the pistons of said units to be variable in their working strokes.

7. Tracer valve unit according to claim 6, wherein the adjustable means on the operating element comprises an axially movable bush, means for moving the bush on said element, a concentric rib on the bush, and a pivoted valve operating lever for each valve unit, said lever being engaged by said rib which is variable in its position relative each lever fulcrum.

8. Tracer valve unit according to claim 1, wherein the electric supply means for the switches comprise a set of axially spaced conductive rings mounted concentrically on and insulated from the carrier member, and stationary spring loaded brushes engaging the rings.

9. Tracer valve unit according to claim 1, wherein the valve operating element has an axially movable member mounted concentrically therein to move laterally therewith, said member having the stylus at one end to cause lateral deflections of both element and member and also axial movements of the member to operate a further flow control valve at its opposite end.

10. Tracer valve unit according to claim 1 in combination with a hydraulic valve controlled system, said system being connected to said fluid flow control valve units, at least two further flow control valves in the system, electrical operating means for each further valve, and piston-cylinder units operable by said system and connected to a machine tool part to control its movements.

References Cited

UNITED STATES PATENTS

| | | | |
|---|---|---|---|
| 1,996,439 | 4/1935 | Shaw | 90—62 |
| 2,879,695 | 3/1959 | Lavieri et al. | 90—62 |
| 2,788,718 | 4/1957 | Martellotti | 90—62 |
| 2,841,356 | 7/1958 | Glaser | 90—62 |
| 3,114,295 | 12/1963 | Ronner et al. | 90—62 |

GERALD A. DOST, *Primary Examiner.*